(12) United States Patent
Hasegawa et al.

(10) Patent No.: US 8,451,948 B2
(45) Date of Patent: May 28, 2013

(54) CARRIER RECOVERING APPARATUS AND CARRIER RECOVERING METHOD

(75) Inventors: Teruaki Hasegawa, Osaka (JP); Yoshikazu Hayashi, Osaka (JP); Yousuke Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 12/279,933

(22) PCT Filed: Dec. 6, 2007

(86) PCT No.: PCT/JP2007/073606
§ 371 (c)(1),
(2), (4) Date: Aug. 19, 2008

(87) PCT Pub. No.: WO2008/072552
PCT Pub. Date: Jun. 19, 2008

(65) Prior Publication Data
US 2010/0158090 A1    Jun. 24, 2010

(30) Foreign Application Priority Data
Dec. 15, 2006    (JP) .................................. 2006-338379

(51) Int. Cl.
*H04L 1/00*    (2006.01)

(52) U.S. Cl.
USPC ........................................................ 375/326

(58) Field of Classification Search
USPC ... 375/326, 261, 344; 348/726, 731; 370/203; 381/15; 455/133, 137, 139; 725/31, 131, 725/139
See application file for complete search history.

(56) References Cited

U.S. PATENT DOCUMENTS

| | | | | |
|---|---|---|---|---|
| 5,465,271 A | * | 11/1995 | Hladik et al. | 375/267 |
| 5,832,040 A | * | 11/1998 | Yamanaka et al. | 375/326 |
| 6,473,470 B1 | * | 10/2002 | Matui | 375/340 |
| 2004/0114701 A1 | | 6/2004 | Markman | |
| 2005/0141645 A1 | * | 6/2005 | Kim et al. | 375/326 |
| 2005/0207514 A1 | | 9/2005 | Hayashi et al. | |

(Continued)

FOREIGN PATENT DOCUMENTS

| | | |
|---|---|---|
| JP | 7-193609 | 7/1995 |
| JP | 11-136301 | 5/1999 |

(Continued)

OTHER PUBLICATIONS

Taga, N., et al., "A Study of QPSK demodulation system", IETJ Technical Report, Aug. 1991, pp. 19-24, CE 91-42 vol. 15 No. 46, Institute of Television Engineers of Japan (ITEJ).

*Primary Examiner* — Sam K Ahn
*Assistant Examiner* — Shawkat M Ali
(74) *Attorney, Agent, or Firm* — McDermott Will & Emery LLP

(57) ABSTRACT

A carrier recovering apparatus, in which degradation of the demodulation performance caused when a pilot signal cannot be normally received is suppressed, includes a rotation calculator for multiplying a baseband signal and an oscillation signal and outputting a multiplied signal; a pilot signal extractor for extracting a pilot signal from the signal output from the rotation calculator; an error detection controller for outputting a phase error between the pilot signal and a reference signal as a value restricted within a given range; a loop filter for smoothing the phase error output from the error detection controller and outputting the smoothed phase error; and a variable frequency oscillator for generating a signal in accordance with the output of the loop filter and outputting the generated signal as the oscillation signal.

24 Claims, 11 Drawing Sheets

U.S. PATENT DOCUMENTS

2006/0078071 A1 4/2006 Lee
2006/0171487 A1 8/2006 Nawa et al.

FOREIGN PATENT DOCUMENTS

| | | |
|---|---|---|
| JP | 2001-245011 | 9/2001 |
| JP | 2002-051092 | 2/2002 |
| JP | 2002-51092 | 2/2002 |
| JP | 2006-129536 | 5/2006 |
| JP | 2006-217054 | 8/2006 |
| WO | WO 02/084967 A2 | 10/2002 |

* cited by examiner

CARRIER RECOVERING APPARATUS AND CARRIER RECOVERING METHOD

TECHNICAL FIELD

The present invention relates to a carrier recovering apparatus used in demodulating a modulated signal including a pilot signal.

BACKGROUND ART

Digitalization of images has recently been remarkably developed, and digital broadcasting of satellite broadcasting, CATV and terrestrial broadcasting has been started in various countries. As the transmission scheme for the digital broadcasting, a scheme suitable for the characteristic of the used channel is selectively employed. For example, in the terrestrial broadcasting of U.S.A., a VSB (vestigial-sideband) modulation scheme is employed. Demodulation systems for digital modulated signals used in such broadcasting are described in various documents (see, for example, Non-patent Document 1).

In the case where a carrier is recovered from, for example, a VSB modulated signal including a pilot signal, the pilot signal is extracted, and a frequency error and a phase error are obtained on the basis of a difference between the extracted pilot signal and a reference signal.

Non-patent Document 1: Taga, Ishikawa and Komatsu, "A Study on QPSK demodulation system", ITEJ Technical Report, published by the Institute of Television Engineers of Japan (ITEJ), August 1991, Vol. 15, No. 46, CE' 91-42, pp. 20-24 (FIG. 30)

DISCLOSURE OF THE INVENTION

Problems to be Solved by the Invention

The pilot signal is, however, damaged or disappeared depending upon the state of the channel, for example, when there is a reflected wave, and hence, a residual phase error is caused within a negative feedback control loop of a carrier recovering circuit. As a result, the demodulation performance is disadvantageously degraded.

Furthermore, when the degradation of the demodulation performance is to be minimized, a loop gain of the negative feedback control loop is reduced, which may cause a problem of, for example, degradation of the tracking performance when a phase noise characteristic is poor.

An object of the invention is suppressing the degradation of the demodulation performance conventionally caused when a pilot signal cannot be normally received while retaining the tracking performance for phase noise when a pilot signal can be normally received.

Means for Solving Problems

The first carrier recovering apparatus of this invention includes a rotation calculator for multiplying a baseband signal and an oscillation signal and outputting a multiplied signal; a pilot signal extractor for extracting a pilot signal from the signal output from the rotation calculator; an error detection controller for outputting a phase error between the pilot signal and a reference signal as a value restricted within a given range; a loop filter for smoothing the phase error output from the error detection controller and outputting the smoothed phase error; and a variable frequency oscillator for generating a signal in accordance with the output of the loop filter and outputting the generated signal as the oscillation signal.

Thus, the value of the detected phase error is restricted within the given range, and therefore, the degradation of the demodulation performance caused when a pilot signal cannot be normally received can be suppressed without sacrificing the tracking performance for phase noise attained when the pilot signal can be normally received.

The second carrier recovering apparatus of this invention includes a rotation calculator for multiplying a baseband signal and an oscillation signal and outputting a multiplied signal; a pilot signal extractor for extracting a pilot signal from the signal output from the rotation calculator; a channel quality estimating part for estimating channel quality on the basis of the signal output from the rotation calculator; a control deciding part for obtaining a control signal in accordance with the channel quality; an error detection controller for outputting a phase error between the pilot signal and a reference signal as a value restricted within a given range or directly outputting the phase error in accordance with the control signal; a loop filter for smoothing the phase error output from the error detection controller and outputting the smoothed phase error; and a variable frequency oscillator for generating a signal in accordance with the output of the loop filter and outputting the generated signal as the oscillation signal.

Thus, the value of the detected phase error is restricted within the given range in accordance with the channel quality, and therefore, the degradation of the demodulation performance caused when a pilot signal cannot be normally received can be suppressed without sacrificing the tracking performance for phase noise attained when the pilot signal can be normally received.

The third carrier recovering apparatus of this invention includes a rotation calculator for multiplying a baseband signal and an oscillation signal and outputting a multiplied signal; a pilot signal extractor for extracting a pilot signal from the signal output from the rotation calculator; an error detection controller for obtaining a phase error between the pilot signal and a reference signal and outputting a value in accordance with the phase error; a loop filter for amplifying the value output from the error detection controller in accordance with a filter gain, smoothing the amplified value and outputting the smoothed value; a variable frequency oscillator for generating a signal in accordance with the value output from the loop filter and outputting the generated signal as the oscillation signal; a channel quality estimating part for obtaining channel quality on the basis of the signal output from the rotation calculator; and a gain setting part for setting the filter gain in accordance with the channel quality.

Thus, the filter gain of the loop filter is set in accordance with the channel quality, and therefore, the degradation of the demodulation performance caused when a pilot signal cannot be normally received can be suppressed without sacrificing the tracking performance for phase noise attained when the pilot signal can be normally received.

Effect of the Invention

According to the present invention, it is possible to suppress the degradation of the demodulation performance when a pilot signal cannot be normally received as well as to retain the tracking performance for phase noise when the pilot signal can be normally received while suppressing the whole circuit scale.

Figure 1:
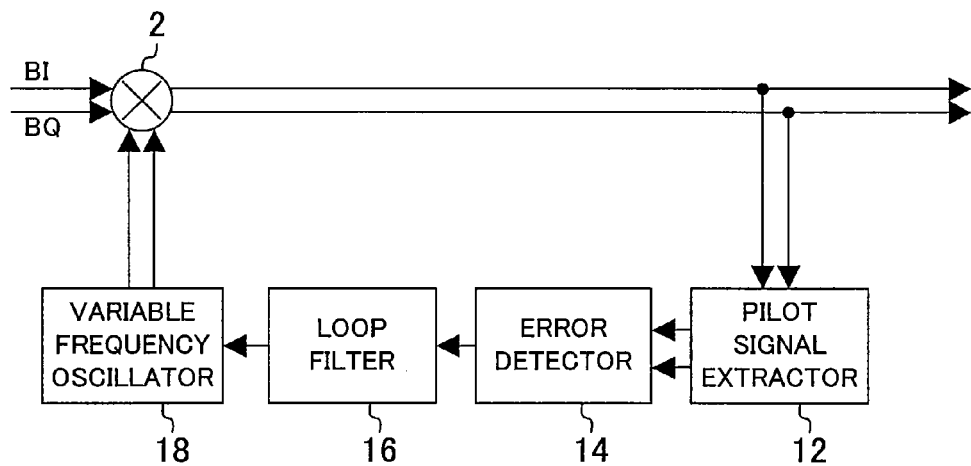
FIG. 1 is a block diagram for showing the architecture of a carrier recovering apparatus according to Embodiment 1 of the invention.

DESCRIPTION OF REFERENCE NUMERALS 2 rotation calculator
12 pilot signal extractor
13 output signal selector
14 error detector
15, 315 restricting part
16, 316 loop filter
18 variable frequency oscillator
20, 220, 320 error detection controller
62 channel quality estimating part
66 control deciding part
68 gain setting part

BEST MODE FOR CARRYING OUT THE INVENTION

Preferred embodiments of the invention will now be described with reference to the accompanying drawings.

Embodiment 1

FIG. 1 is a block diagram for showing the architecture of a carrier recovering apparatus according to Embodiment 1 of the invention. The carrier recovering apparatus of FIG. 1 includes a rotation calculator 2, a pilot signal extractor 12, an error detector 14, a loop filter 16 and a variable frequency oscillator 18. It is assumed that a signal in accordance with the ATSC (Advanced Television Systems Committee) standards is received to obtain a baseband signal through quadrature demodulation and that the baseband signal is input to the carrier recovering apparatus of FIG. 1. The received signal has been VSB modulated and includes a pilot signal. A baseband signal is a complex signal and is composed of an in-phase signal BI and a quadrature signal BQ.

When the signal is subjected to the quadrature demodulation in a stage previous to the carrier recovering apparatus of FIG. 1, a carrier used for the quadrature demodulation does not always have an accurate frequency and an accurate phase. Therefore, there remains shift in the frequency and the phase in the in-phase signal BI and the quadrature signal BQ.

When the in-phase signal (I signal) is indicated by Si and the quadrature signal (Q signal) is indicated by Sq, the baseband signal input to the carrier recovering apparatus of FIG. 1 is represented by the following Expression (1):

$$(Si+jSq) \cdot \exp(j(\Delta Wt+\Delta\theta)) \quad (1)$$

wherein $\Delta W$ is shift in frequency and $\Delta\theta$ is shift in phase.

It is assumed that the variable frequency oscillator 18 outputs the following signal in a conjugate relationship with a carrier component $\exp(j(\Delta Wt+\Delta\theta))$ of the signal represented by Expression (1):

$$\exp(-j(\Delta Wt+\Delta\theta)) \quad (2)$$

The rotation calculator 2 performs complex multiplication of the output of the variable frequency oscillator 18 and the input baseband signal as represented by the following Expression (3):

$$(Si+jSq) \cdot \exp(j(\Delta Wt+\Delta\theta)) \cdot \exp(-j(\Delta Wt+\Delta\theta)) = (Si+jSq) \quad (3)$$

The rotation calculator 2 removes the shift in frequency and phase of the input baseband signal so as to output a resultant demodulated signal (Si+jSq).

The pilot signal extractor 12 extracts a pilot signal from the demodulated signal and outputs the extracted pilot signal to the error detector 14. The error detector 14 detects a phase error of the received digital modulated signal on the basis of the extracted pilot signal and outputs the detected phase error to the loop filter 16. When the variable frequency oscillator 18 outputs the signal represented by Expression (2), the error detector 14 detects 0 as the phase error. Alternatively, when the variable frequency oscillator 18 outputs a signal having a phase error from the signal represented by Expression (2), the error detector 14 detects the phase error.

The loop filter 16 smoothes the output of the error detector 14, namely, removes a high frequency component from the obtained phase error, and outputs the resultant as a control signal to the variable frequency oscillator 18. The variable frequency oscillator 18 generates an oscillation signal of a frequency in accordance with the output signal from the loop filter 16 and outputs the generated signal to the rotation calculator 2.

Since a phase control loop thus formed works as a negative feedback control loop, a carrier synchronized in phase with the received digital modulated signal is recovered in the variable frequency oscillator 18. The thus recovered carrier is in a conjugate relationship with a carrier component of the baseband signal input to the rotation calculator 2, and since there is no error in frequency and no error in phase between them, a correct demodulated signal can be obtained.

Figure 2:
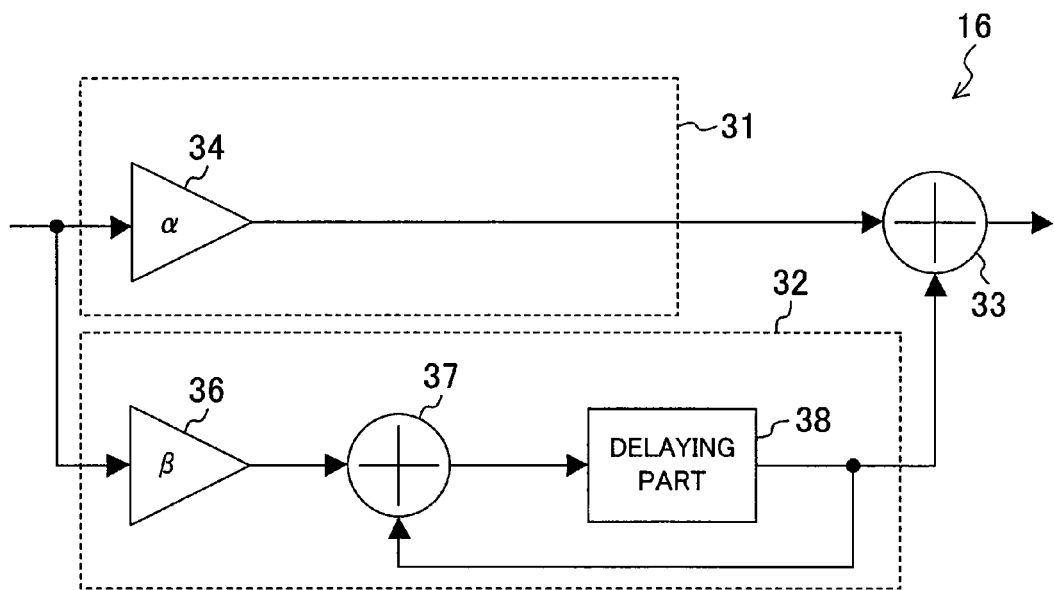
FIG. 2 is a block diagram for showing an exemplified configuration of a loop filter of FIG. 1.

FIG. 2 is a block diagram for showing an exemplified configuration of the loop filter 16 of FIG. 1. The loop filter 16 includes a direct system circuit 31, an integral system circuit 32 and an adder 33. The direct system circuit 31 includes an amplifier 34. The integral system circuit 32 includes an amplifier 36, an adder 37 and a delaying part 38.

The amplifier 34 of the direct system circuit 31 amplifies a phase error signal output from the error detector 14 by an amplification degree $\alpha$. The variable frequency oscillator 18 advances (or delays) the phase of its output signal in proportion to the input control signal. Accordingly, the direct system circuit 31 linearly advances (or delays) the phase of the output signal of the variable frequency oscillator 18 against the phase error signal. In other words, the direct system circuit 31 performs phase error correction in the carrier recovery processing.

On the other hand, the amplifier 36 of the integral system circuit 32 amplifies the input phase error signal by an amplification degree β and outputs the resultant. The adder 37 adds the output of the amplifier 36 and the output of the delaying part 38 to each other and outputs the addition result. The delaying part 38 delays the output of the adder 37 so as to output the resultant to the adders 33 and 37. A loop composed of the adder 37 and the delaying part 38 has an integral function. Accordingly, the integral system circuit 32 controls the frequency of the output signal of the variable frequency oscillator 18 on the basis of the phase error signal. In other words, the integral system circuit 32 performs frequency error correction in the carrier recovery processing.

Figure 3:
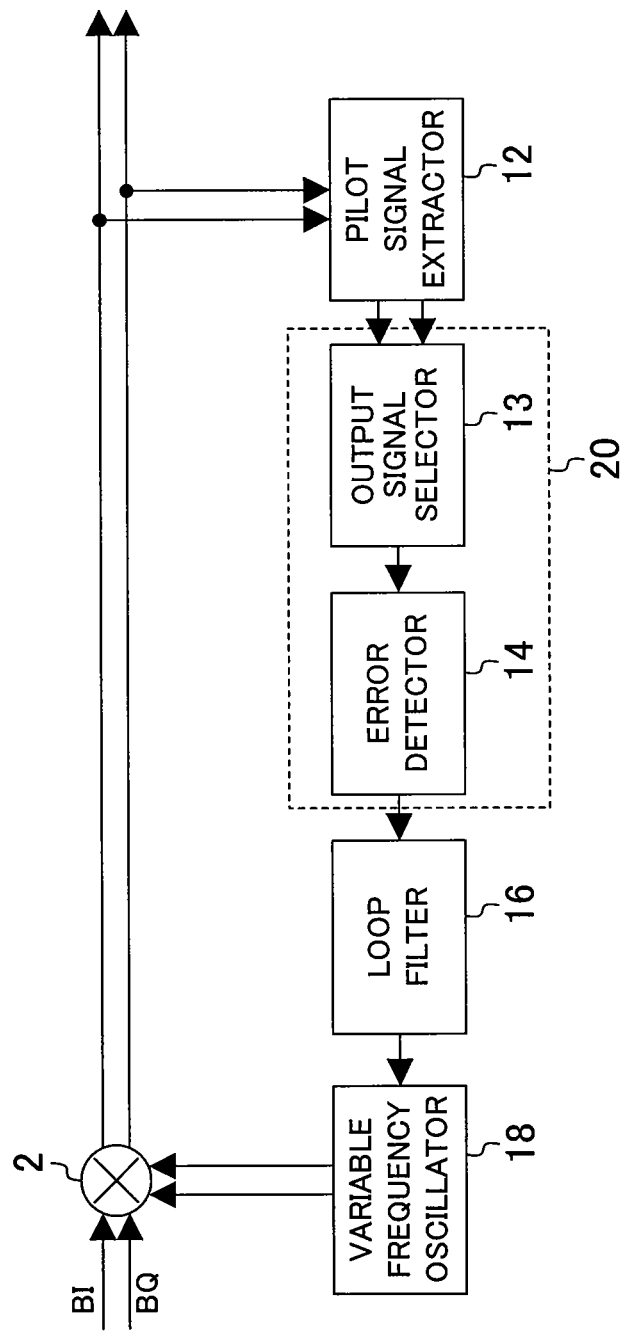
FIG. 3 is a block diagram for showing the architecture of a carrier recovering apparatus according to a modification of Embodiment 1.

FIG. 3 is a block diagram for showing the architecture of a carrier recovering apparatus according to a modification of Embodiment 1. The carrier recovering apparatus of FIG. 3 is obtained by further providing an output signal selector 13 in the carrier recovering apparatus of FIG. 1. The output signal selector 13 and the error detector 14 together form an error detection controller 20.

Figure 4:
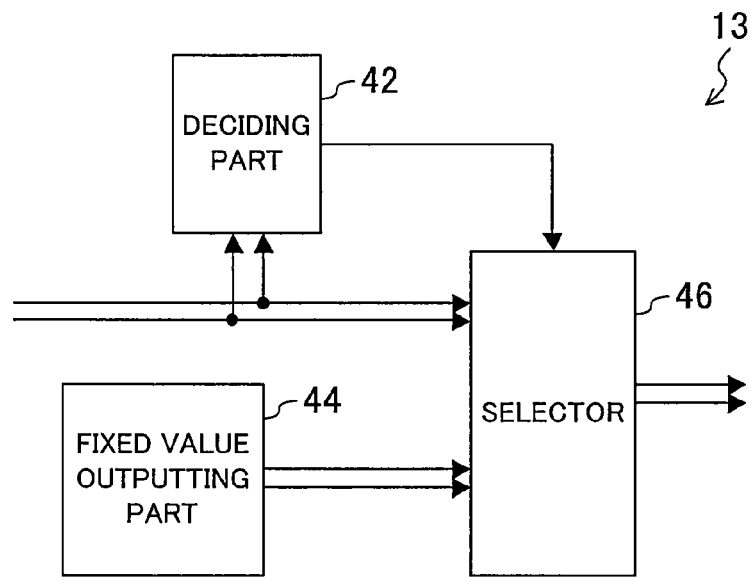
FIG. 4 is a block diagram for showing an exemplified configuration of an output signal selector of FIG. 3.

FIG. 4 is a block diagram for showing an exemplified configuration of the output signal selector 13 of FIG. 3. The output signal selector 13 includes a deciding part 42, a fixed value outputting part 44 and a selector 46.

The deciding part 42 makes decision in accordance with a relationship between an in-phase signal component Pi and a quadrature signal component Pq of the pilot signal output from the pilot signal extractor 12, and outputs the decision result to the selector 46. The fixed value outputting part 44 outputs a fixed value to the selector 46. The selector 46 selects and outputs either the pilot signal or the output of the fixed value outputting part 44 in accordance with the decision result of the deciding part 42.

The deciding part 42 outputs a decision result corresponding to selection of the pilot signal when, for example, the following Expressions (4) and (5) are simultaneously satisfied:

$$Pi > 0 \quad (4)$$

$$Pi > |Pq| \quad (5)$$

When Expressions (4) and (5) are not simultaneously satisfied, it outputs a decision result corresponding to selection of the output of the fixed value outputting part 44.

Figure 5:
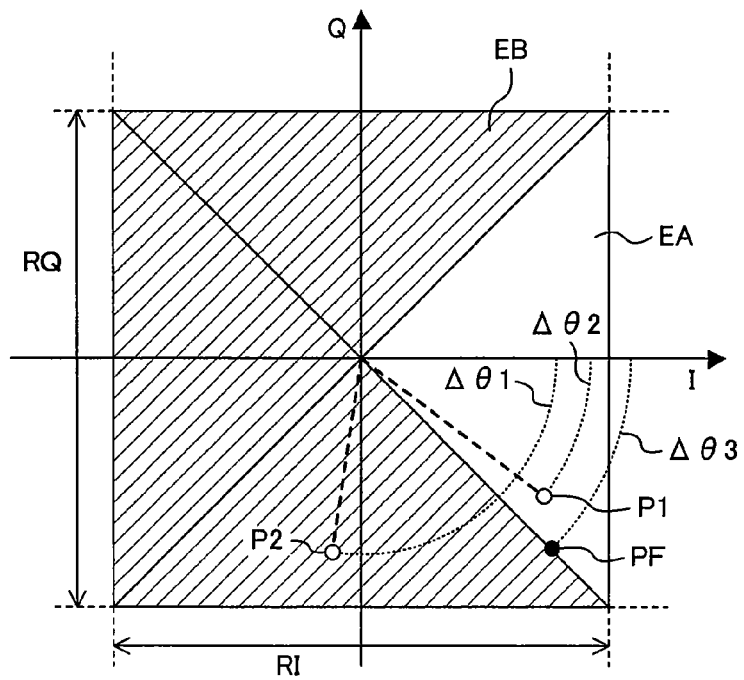
FIG. 5 is a graph for explaining the operation of a deciding part of FIG. 4.

FIG. 5 is a graph for explaining the operation of the deciding part 42 of FIG. 4. The deciding part 42 decides to select a pilot signal when the input pilot signal has a signal point within an area EA of FIG. 5 and decides to select the output of the fixed value outputting part 44 when the input pilot signal has a signal point within an area EB of FIG. 5. In FIG. 5, RI and RQ respectively correspond to possible ranges of the I signal component Pi and the Q signal component Pq.

For example, in the case where the input pilot signal has a signal point corresponding to a signal point P1 of a complex plane of FIG. 5, Expressions (4) and (5) are satisfied, and hence, the deciding part 42 decides to select the pilot signal. At this point, the error detector 14 detects a phase error Δθ2 between the pilot signal and a reference signal (that is, an I axis).

Depending upon the state of a channel, for example, when there is a reflected wave, a pilot signal may not be normally received because it is damaged or disappeared. In such a case, when the selector 46 selects the output of the pilot signal extractor 12, the pilot signal is unavoidably regarded to have, for example, a signal point P2 even though the output of the loop filter 16 is converged. Then, even when the phase error of the carrier is not actually large, the carrier recovering apparatus of FIG. 1 is operated to cancel the phase error larger than the actual phase error, and therefore, a phase error remains within the negative feedback control loop on the contrary. This degrades the demodulation performance.

Therefore, the deciding part 42 decides to select the output of the fixed value outputting part 44 when the pilot signal has a signal point corresponding to, for example, the signal point P2. Assuming that the fixed value outputting part 44 outputs a value corresponding to a signal point PF, the phase error is reduced from Δθ1 to Δθ3. Thus, a phase error remaining in the negative feedback control loop can be suppressed.

As described so far, in the carrier recovering apparatus of FIG. 3, the tracking performance for phase noise and the demodulation performance attained when a pilot signal cannot be normally received due to the influence of a reflected wave or the like can be both satisfactorily attained through simple decision.

It is noted that the fixed value outputting part 44 and the selector 46 of FIG. 4 may be replaced with a processing unit for performing clipping processing through bit width restriction of an input signal in accordance with a decision result so as to output a resultant signal.

Furthermore, the output signal selector 13 may output, as the pilot signal, a signal having been output immediately before in the case where the pilot signal has a signal point outside the area EA of FIG. 5.

Embodiment 2

Figure 6:
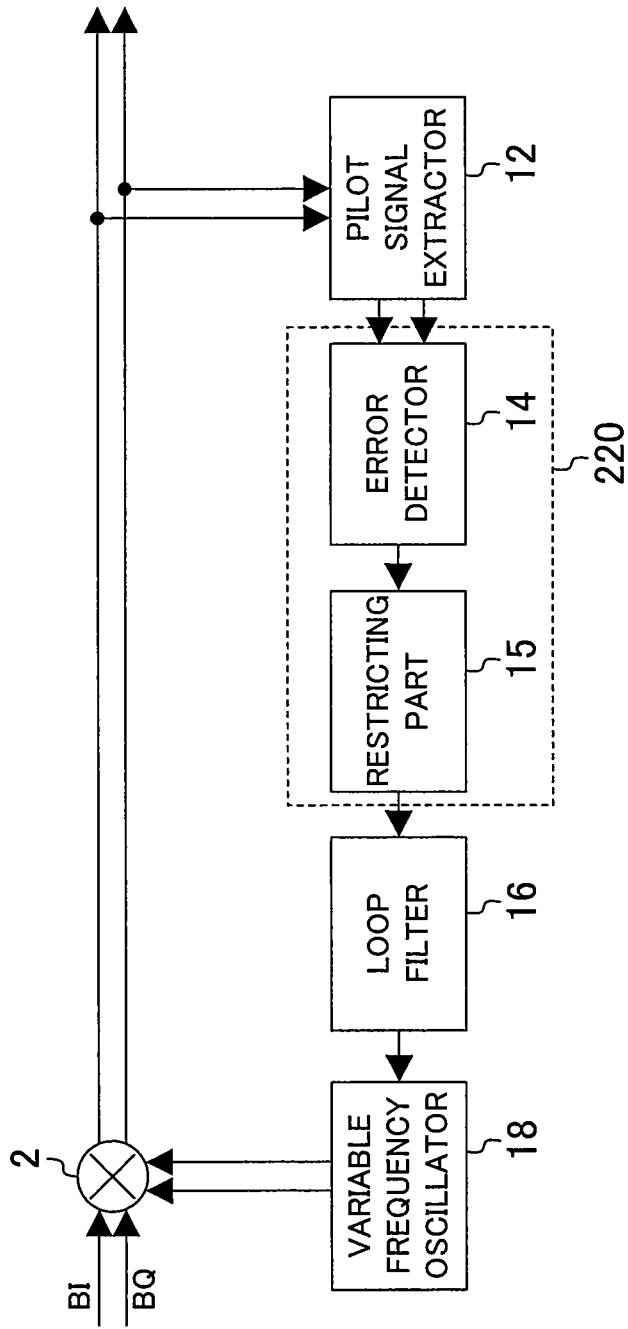
FIG. 6 is a block diagram for showing the architecture of a carrier recovering apparatus according to Embodiment 2 of the invention.

FIG. 6 is a block diagram for showing the architecture of a carrier recovering apparatus according to Embodiment 2 of the invention. The carrier recovery apparatus of FIG. 6 is obtained by further providing a restricting part 15 in the carrier recovering apparatus of FIG. 1. An error detector 14 and the restricting part 15 together form an error detection controller 220. The other composing elements are the same as those described with reference to FIG. 1 and hence the description is omitted by referring them by using like reference numerals.

Figure 7:
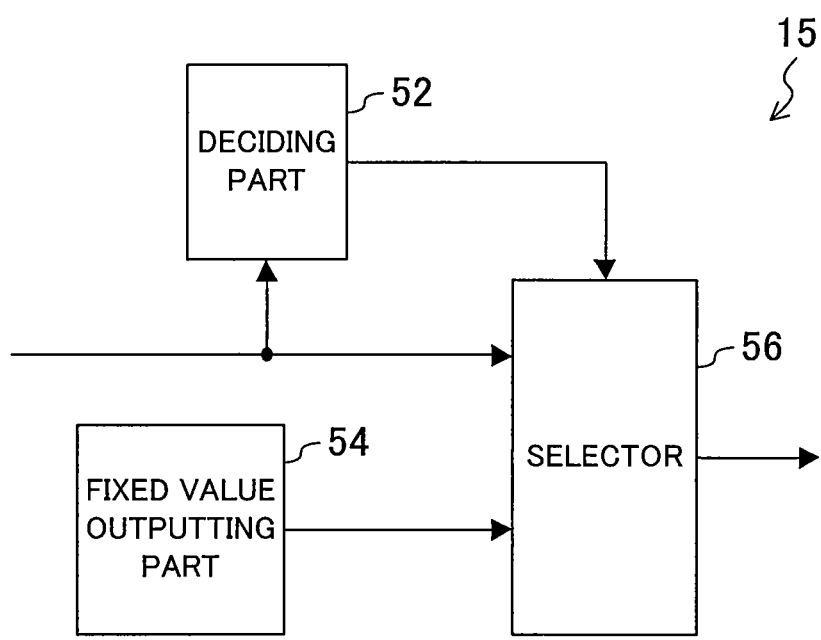
FIG. 7 is a block diagram for showing an exemplified configuration of a restricting part of FIG. 6.

FIG. 7 is a block diagram for showing an exemplified configuration of the restricting part 15 of FIG. 6. The restricting part 15 includes a deciding part 52, a fixed value outputting part 54 and a selector 56. The deciding part 52 makes a decision in accordance with a phase error PE output by the error detector 14 and outputs the decision result to the selector 56. The fixed value outputting part 54 outputs a fixed value to the selector 56. The selector 56 selects and outputs either the phase error PE or the output of the fixed value outputting part 54 in accordance with the decision result of the deciding part 52.

When the following Expressions (6) and (7) are simultaneously satisfied, the deciding part 52 outputs a decision result corresponding to selection of the phase error:

$$PE < \pi/4 \quad (6)$$

$$PE > -\pi/4 \quad (7)$$

When Expressions (6) and (7) are not simultaneously satisfied, it outputs a decision result corresponding to selection of the output of the fixed value outputting part 54.

Figure 8:
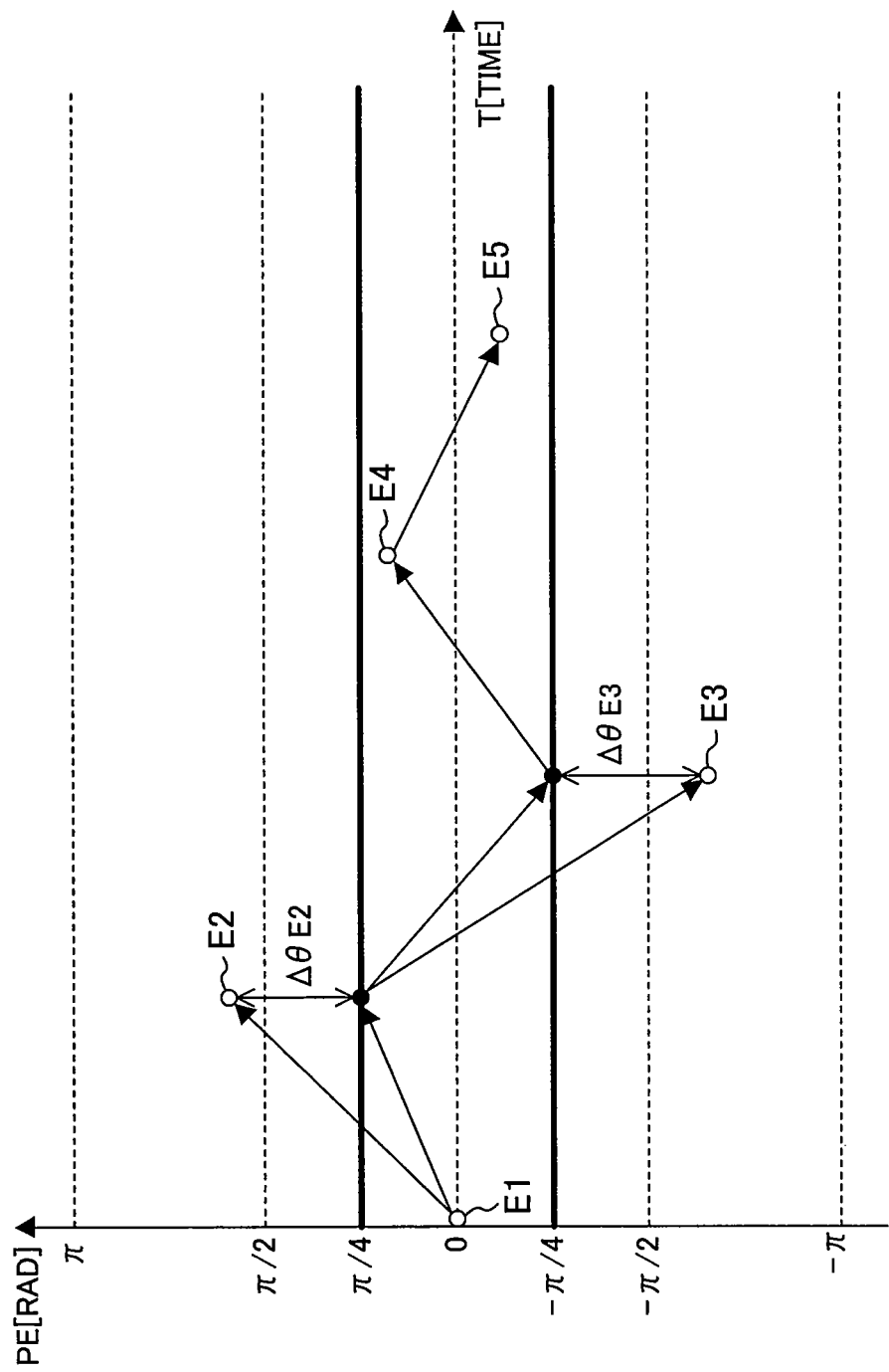
FIG. 8 is a graph for explaining the operation of a deciding part of FIG. 7.

FIG. 8 is a graph for explaining the operation of the deciding part 52 of FIG. 7. When the phase error PE satisfies a relationship of $-\pi/4<PE<\pi/4$, the deciding part 52 decides to select the phase error PE, and when the phase error PE does not satisfy the relationship of $-\pi/4<PE<\pi/4$, the deciding part 52 decides to select any output of the fixed value outputting part 54. It is assumed that the fixed value outputting part 54 outputs values corresponding to $\pm\pi/4$.

In the case where the error PE is represented by, for example, a point E1, E4 or E5 of FIG. 8, Expressions (6) and (7) are satisfied, and therefore, the deciding part 52 decides to select the error PE. On the other hand, when the error PE is larger than $\pi/4$ (corresponding to a point E2), the deciding part 52 decides to select the output $\pi/4$ of the fixed value outputting part 54. Alternatively, when the error PE is smaller than $-\pi/4$ (corresponding to a point E3), the deciding part 52 decides to select the output $-\pi/4$ of the fixed value outputting part 54. In this manner, the phase error PE can be suppressed to $\pi/4$, and hence, a phase error remaining in the negative feedback control loop can be suppressed.

As described so far, in the carrier recovering apparatus of FIG. 6, the tracking performance for phase noise and the demodulation performance attained when a pilot signal cannot be normally received due to the influence of a reflected wave or the like can be both satisfactorily attained through simple decision with a smaller circuit scale.

It is noted that the fixed value outputting part 54 and the selector 56 of FIG. 7 may be replaced with a processing unit for performing clipping processing through bit width restriction of an input signal in accordance with a decision result so as to output a resultant signal.

Also, the error detection controller 220 may further include a measuring part for obtaining a rate of change against time of the phase error PE output from the error detector 14, so that the restricting part 15 can select and output either the phase error obtained by the error detector 14 or a given value in accordance with the rate of change of the phase error PE.

Embodiment 3

Figure 9:
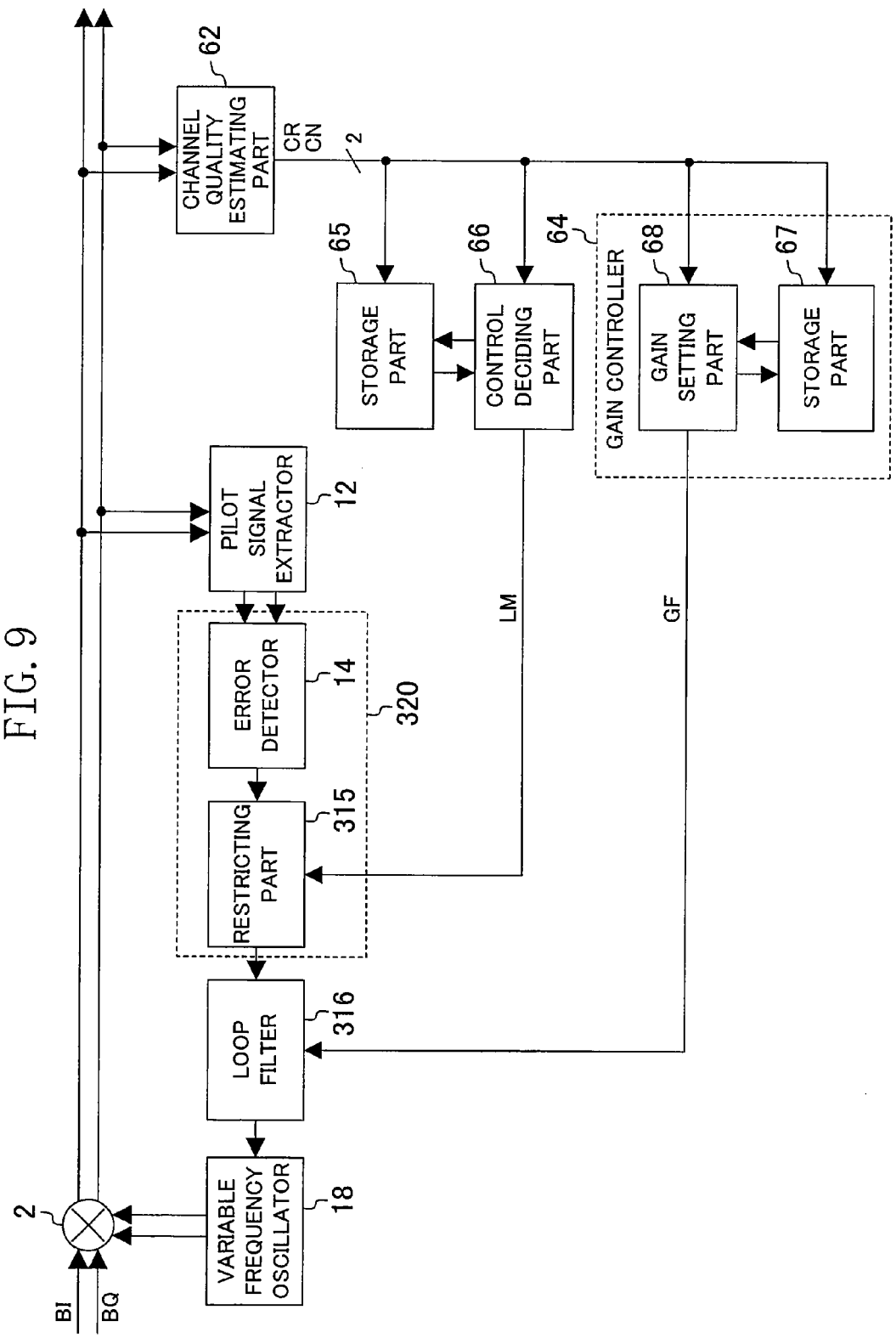
FIG. 9 is a block diagram for showing the architecture of a carrier recovering apparatus according to Embodiment 3 of the invention.

FIG. 9 is a block diagram for showing the architecture of a carrier recovering apparatus according to Embodiment 3 of the invention. The carrier recovering apparatus of FIG. 9 is obtained by replacing the restricting part 15 and the loop filter 16 of the carrier recovering apparatus of FIG. 6 with a restricting part 315 and a loop filter 316 and further providing a channel quality estimating part 62, a gain controller 64, a storage part 65 and a control deciding part 66. The gain controller 64 includes a storage part 67 and a gain setting part 68. An error detector 14 and the restricting part 315 together form an error detection controller 320. The other composing elements are the same as those described with reference to FIG. 1 and hence the description is omitted by referring them by using like reference numerals.

The channel quality estimating part 62 obtains and outputs a correlation value CR between the output of a rotation calculator 2 and a given data pattern and a C/N value CN (a ratio of carrier power to noise power) of the output of the rotation calculator 2 as channel quality. In this embodiment, a value corresponding to a reflected wave is particularly used as the correlation value CR. In a signal according to the ATSC standards, a given data pattern is present in a field synchronization segment.

The restricting part 315 decides whether or not a phase error value is to be restricted in accordance with an error control signal LM. Apart from this, the restricting part 315 is the same as the restricting part 15 of FIG. 6. The loop filter 316 is constructed to control the amplification factor of one or both of an amplifier 34 of a direct system circuit 31 and an amplifier 36 of an integral system circuit 32 in the loop filter 16 of FIG. 2 in accordance with a gain control signal GF. Apart from this, the loop filter 316 is the same as the loop filter 16 of FIG. 2.

Figure 10:
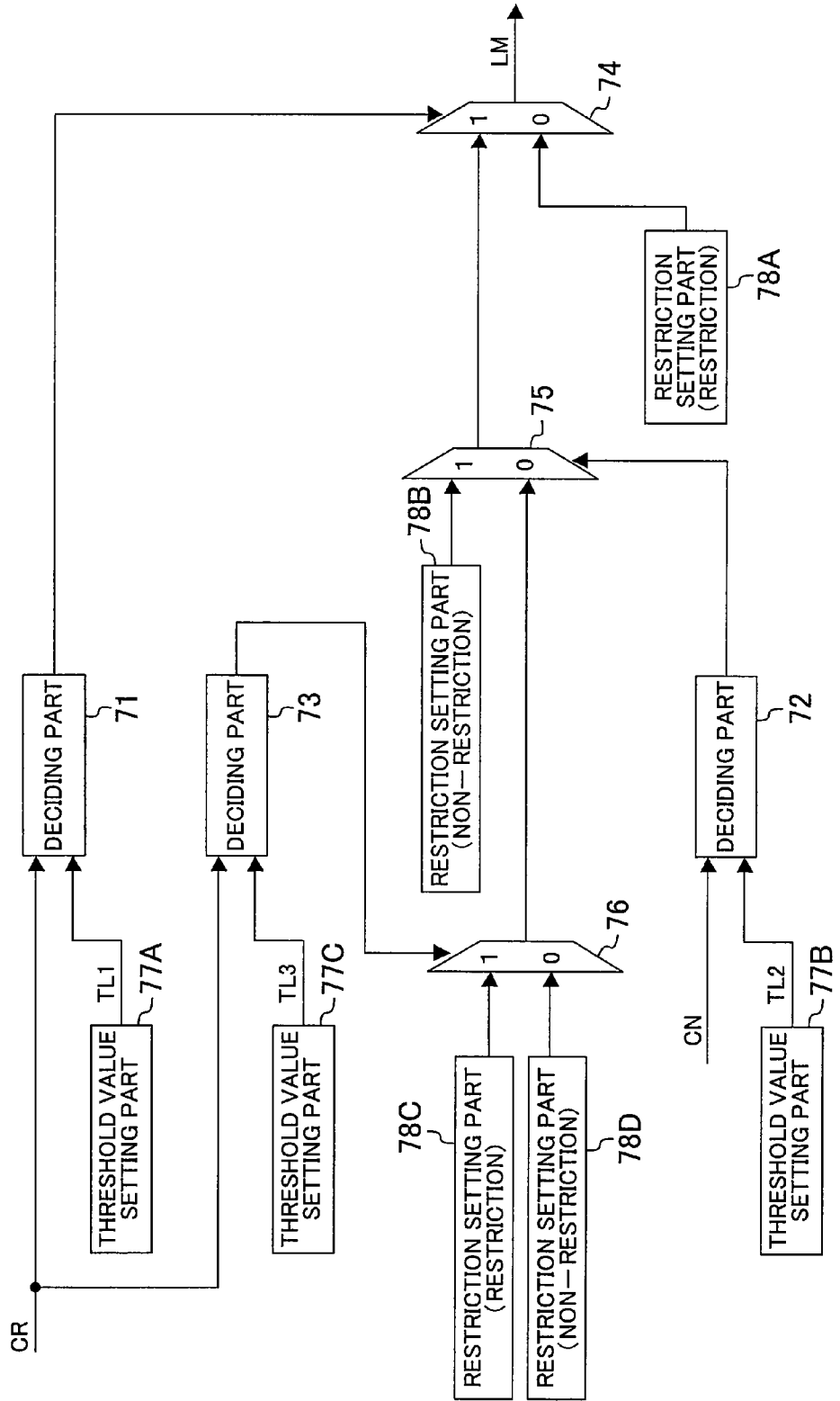
FIG. 10 is a block diagram for showing an exemplified configuration of a control deciding part of FIG. 9.

FIG. 10 is a block diagram for showing an exemplified configuration of the control deciding part 66 of FIG. 9. The control deciding part 66 includes deciding parts 71, 72 and 73, selectors 74, 75 and 76, threshold value setting parts 77A, 77B and 77C, and restriction setting parts 78A, 78B, 78C and 78D. The threshold value setting parts 77A through 77C respectively output threshold values TL1, TL2 and TL3 (whereas TL1<TL3). The restriction setting parts 78A and 78C output signals corresponding to restriction of a phase error value. The restriction setting parts 78B and 78D output signals corresponding to non-restriction of a phase error value.

The deciding part 71 compares the correlation value CR with the threshold value TL1, and when the correlation value CR is smaller, it controls the selector 74 so as to select the output of the restriction setting part 78A. The selector 74 outputs an error control signal LM to the restricting part 315 so as to restrict a phase error value. In this case, the restricting part 315 restricts the phase error value. In the case where there is a large reflected wave in the channel, the correlation value CR is small. In this case, the degradation of the demodulation performance can be prevented by restricting the phase error value even when a pilot signal cannot be normally received due to the influence of the reflected wave or the like. The deciding part 71 controls the selector 74 so as to select the output of the selector 75 when the correlation value CR is not less than the threshold value TL1.

When the correlation value CR is not less than the threshold value TL1, the following processing is performed: When the C/N value CN is not less than the threshold value TL2, the deciding part 72 controls the selector 75 so as to select the output of the restriction setting part 78B. In this case, the selectors 74 and 75 output an error control signal LM to the restricting part 315 so as not to restrict a phase error value, and the restricting part 315 does not restrict the phase error value. This is for improving the tracking performance for phase noise because no or substantially ignorable error is output in this case after error correction according to the ATSC standards. When the C/N value CN is smaller than the threshold value TL2, the deciding part 72 controls the selector 75 so as to select the output of the selector 76.

When the correlation value CR is not less than the threshold value TL1 and the C/N value CN is smaller than the threshold value TL2, the following processing is performed: When the correlation value CR is smaller than the threshold value TL3, the deciding part 73 controls the selector 76 so as to select the output of the restriction setting part 78C. In this case, the restricting part 315 restricts a phase error value. This is because one factor of the deciding part 72 deciding the C/N value CN being small is highly possibly the influence of a reflected wave. When the correlation value CR is not less than the threshold value TL3, the deciding part 73 controls the selector 76 so as to select the output of the restriction setting part 78D. In this case, the restricting part 315 does not restrict a phase error value. This is because one factor of the deciding part 72 deciding the C/N value CN being small is not highly possibly the influence of a reflected wave.

Figure 11:
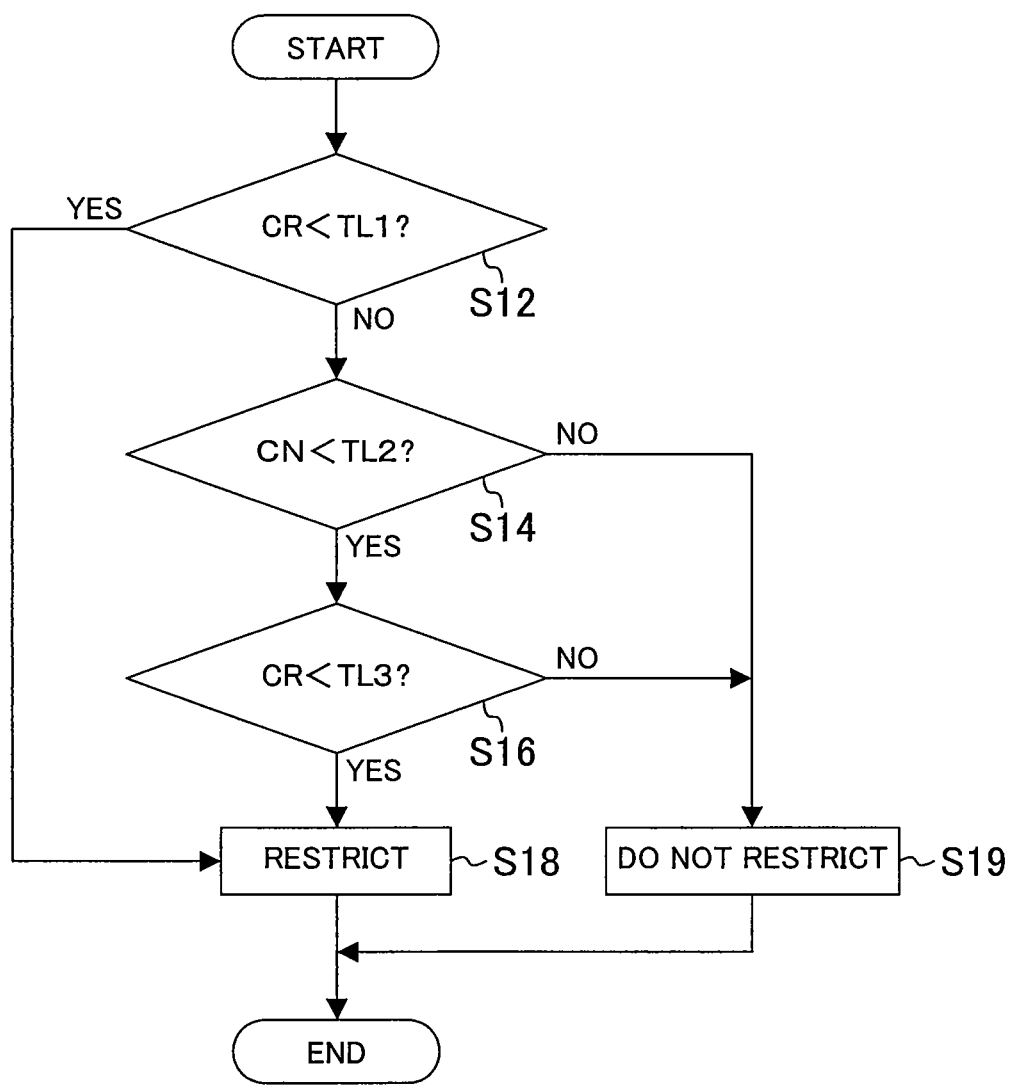
FIG. 11 is a flowchart of processing performed by the control deciding part of FIG. 9.

FIG. 11 is a flowchart of the processing performed by the control deciding part 66 of FIG. 9. In this drawing, the processing described with reference to FIG. 10 is shown as a flowchart.

In step S12, the deciding part 71 compares the correlation value CR with the threshold value TL1. When the correlation value CR is smaller, the procedure proceeds to step S18, and when the correlation value CR is not less than the threshold value TL1, the procedure proceeds to step S14.

In step S14, the deciding part 72 compares the C/N value CN with the threshold value TL2. When the C/N value CN is not less than the threshold value TL2, the procedure proceeds to step S19, and when the C/N value CN is smaller than the threshold value TL2, the procedure proceeds to step S16.

In step S16, the deciding part 73 compares the correlation value CR with the threshold value TL3. When the correlation value CR is smaller than the threshold value TL3, the procedure proceeds to step S18, and when the correlation value CR is not less than the threshold value TL3, the procedure proceeds to step S19.

In step S18, the selector 74 outputs an error control signal LM to the restricting part 315 so as to restrict a phase error value through the control of the deciding parts 71 through 73. In step S19, the selector 74 outputs an error control signal LM to the restricting part 315 so as not to restrict a phase error value through the control of the deciding parts 71 through 73.

Also, the storage part 65 stores an error control signal LM output by the control deciding part 66. In the case where the channel quality obtained by the channel quality estimating part 62 after changing an error control signal LM is lower than that obtained before changing the error control signal LM, the control deciding part 66 reads the error control signal LM used before the change from the storage part 65 so as to output it to the restricting part 315.

In this manner, the restricting part 315 is controlled by using the channel quality obtained by the channel quality estimating part 62. In the case where there is not influence of a reflected wave or the like, the restricting part 315 does not restrict a phase error as far as possible, and therefore, the tracking performance for phase noise can be improved. Alternatively, in the case where there is influence of a reflected wave or the like, the restricting part 315 restricts the phase error, and therefore, the demodulation performance can be improved.

It is noted that an output signal selector may be provided between a pilot signal extractor 12 and the error detector 14 instead of the restricting part 315 in the carrier recovering apparatus of FIG. 9. When an error control signal LM corresponds to restriction of a phase error within a given range and a pilot signal has a signal point outside the area EA of FIG. 5, this output signal selector selectively outputs a signal having a signal point within the area EA in the same manner as the output signal selector 13 of FIG. 3, and otherwise selectively outputs a pilot signal.

Figure 12:
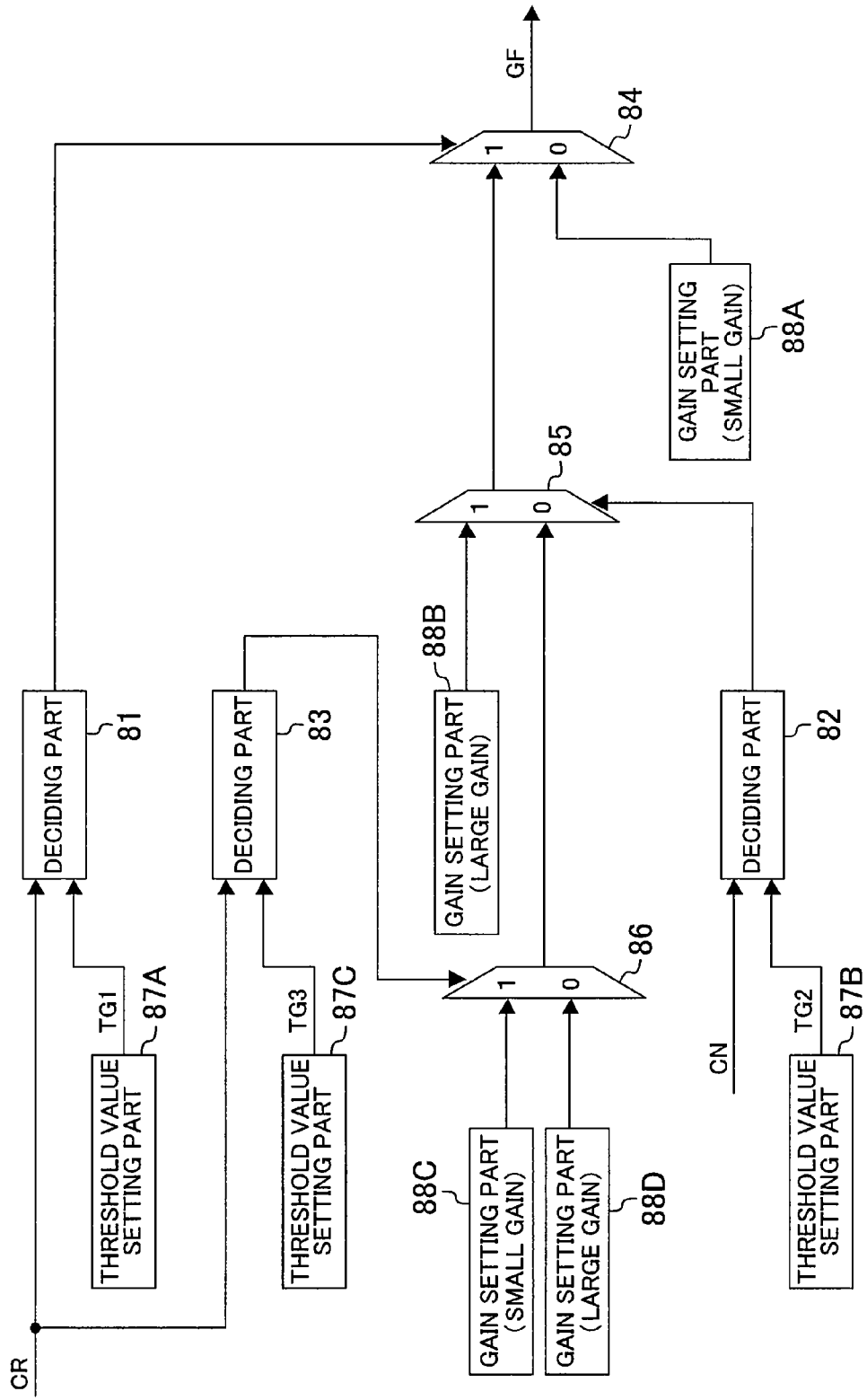
FIG. 12 is a block diagram for showing an exemplified configuration of a gain setting part of FIG. 9.

FIG. 12 is a block diagram for showing an exemplified configuration of the gain setting part 68 of FIG. 9. The gain setting part 68 includes deciding parts 81, 82 and 83, selectors 84, 85 and 86, threshold value setting parts 87A, 87B and 87C, and gain setting parts 88A, 88B, 88C and 88D. The threshold value setting parts 87A through 87C respectively output threshold values TG1, TG2 and TG3 (whereas TG1<TG3). The gain setting parts 88A and 88C output signals corresponding to setting of a small gain. The gain setting parts 88B and 88D output signals corresponding to setting of a large gain.

The deciding part 81 compares the correlation value CR with the threshold value TG1, and when the correlation value CR is smaller, it controls the selector 84 so as to select the output of the gain setting part 88A. The selector 84 outputs a gain control signal GF for reducing the gain of the loop filter 316. In the case where there is a large reflected wave in the channel, the correlation value CR is small. In this case, when the gain of the loop filter 316 is reduced, the degradation of the demodulation performance can be prevented even if the pilot signal cannot be normally received due to the influence of the reflected wave or the like. When the correlation value CR is not less than the threshold value TG1, the deciding part 81 controls the selector 84 so as to select the output of the selector 85.

When the correlation value CR is not less than the threshold value TG1, the following processing is performed: When the C/N value CN is not less than the threshold value TG2, the deciding part 82 controls the selector 85 so as to select the output of the gain setting part 88B. In this case, the selectors 84 and 85 output a gain control signal GF for increasing the gain of the loop filter 316. This is for improving the tracking performance for phase noise because no or substantially ignorable error is output in this case after the error correction in accordance with the ATSC standards. When the C/N value CN is smaller than the threshold value TG2, the deciding part 82 controls the selector 85 so as to select the output of the selector 86.

When the correlation value CR is not less than the threshold value TG1 and the C/N value CN is smaller than the threshold value TG2, the following processing is performed: When the correlation value CR is smaller than the threshold value TG3, the deciding part 83 controls the selector 86 so as to select the output of the gain setting part 88C. This is because one factor of the deciding part 82 deciding the C/N value CN being small is highly possibly the influence of a reflected wave. When the correlation value CR is not less than the threshold value TG3, the deciding part 83 controls the selector 86 so as to select the output of the gain setting part 88D. This is because one factor of the deciding part 82 deciding the C/N value CN being small is not highly possibly the influence of a reflected wave.

Figure 13:
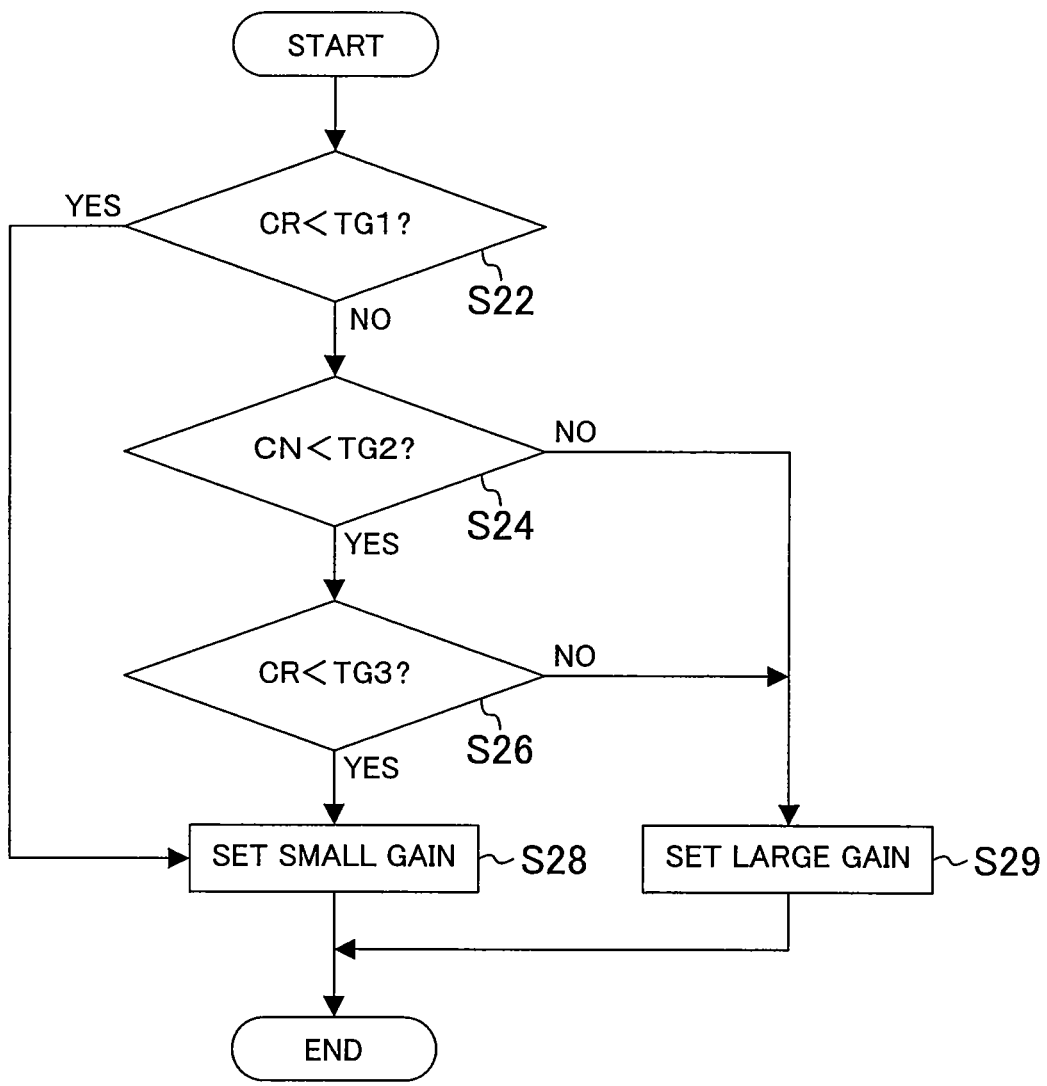
FIG. 13 is a flowchart of processing performed by the gain setting part of FIG. 9.

FIG. 13 is a flowchart of the processing performed by the gain setting part 68 of FIG. 9. In this drawing, the processing described with reference to FIG. 12 is shown as a flowchart.

In step S22, the deciding part 81 compares the correlation value CR with the threshold value TG1. When the correlation value CR is smaller, the procedure proceeds to step S28, and when the correlation value CR is not less than the threshold value TG1, the procedure proceeds to step S24.

In step S24, the deciding part 82 compares the C/N value CN with the threshold value TG2. When the C/N value CN is not less than the threshold value TG2, the procedure proceeds to step S29, and when the C/N value CN is smaller than the threshold value TG2, the procedure proceeds to step S26.

In step S26, the deciding part 83 compares the correlation value CR with the threshold value TG3. When the correlation value CR is smaller than the threshold value TG3, the procedure proceeds to step S28, and when the correlation value CR is not less than the threshold value TG3, the procedure proceeds to step S29.

In step S28, the selector 84 outputs a gain control signal GF to the loop filter 316 so as to reduce the gain through the control of the deciding parts 81 through 83. In step S29, the selector 84 outputs a gain control signal GF to the loop filter 316 so as to increase the gain through the control of the deciding parts 81 through 83.

Also, the storage part 67 stores a gain control signal GF output by the gain setting part 68. In the case where the channel quality obtained by the channel quality estimating part 62 after changing a gain control signal GF is lower than that obtained before changing the gain control signal GF, the gain setting part 68 reads the gain control signal GF used before the change from the storage part 67 so as to output it to the loop filter 316.

In this manner, the loop filter 316 is controlled by using the channel quality obtained by the channel quality estimating part 62. In the case where there is not influence of a reflected wave or the like, the gain of the loop filter 316 is set to be as large as possible, and therefore, the tracking performance for phase noise can be improved. Alternatively, in the case where there is influence of a reflected wave or the like, the gain of the loop filter 316 is set to be small, and therefore, the demodulation performance can be improved.

It is noted that the channel quality estimating part 62 may obtain, as the channel quality, one or more of a correlation value CR, a C/N value CN, ghost signal power, a demodulator output bit error rate, a Viterbi decoder output bit error rate and a Reed-Solomon decoder output packet error rate, so as to perform the processing by the control deciding part 66 and the gain setting part 68 by using the value(s) obtained by the channel quality estimating part 62 instead of the correlation value CR and the C/N value CN. When a value appropriate for a system and the state of a channel is selected as a value corresponding to the channel quality, the control can be more accurately performed.

Also, the values output from the threshold value setting parts 77A through 77C and 87A through 87C, the restriction setting parts 78A through 78D and the gain setting parts 88A through 88D may be externally dynamically or statically set.

Furthermore, the deciding parts 71 through 73 and 81 through 83 may be provided with a hysteresis characteristic against the selection change in accordance with the correlation value CR or the C/N value CN. Thus, frequent switch among the selectors 74 through 76 and 84 through 86 can be prevented.

Moreover, the control deciding part 66 or the gain setting part 68 may be omitted in the carrier recovering apparatus of FIG. 9.

Furthermore, Expressions (4) through (7) are mentioned merely as examples and may be dynamically or statically changed in accordance with the used system, or expressions calculated on the basis of necessary tracking performance for phase noise may be used instead.

Also, the fixed values output by the fixed value outputting parts 44 and 54 may be dynamically or statically changed by an external CPU or the like.

Although a signal according to the ATSC standards and modulated by VSB is received in the aforementioned embodiments, the invention is similarly applicable to a case where a signal modulated by another modulation scheme is received as far as a pilot signal is used.

INDUSTRIAL APPLICABILITY

As described so far, the present invention is useful for a carrier recovering apparatus or the like employed for demodulating a modulated signal including a pilot signal.

The invention claimed is:

1. A carrier recovering apparatus comprising: a rotation calculator for multiplying a baseband signal and an oscillation signal and outputting a multiplied signal; a pilot signal extractor for extracting a pilot signal from the signal output from the rotation calculator; an error detection controller including an output signal selector and an error detector for outputting a phase error between the pilot signal and a reference signal; a loop filter for smoothing the phase error output from the error detection controller and outputting the smoothed phase error; and a variable frequency oscillator for generating a signal in accordance with the output of the loop filter and outputting the generated signal as the oscillation signal, wherein: the output signal selector selects the pilot signal in a case where a signal point determined by an in-phase signal component and a quadrature signal component of the pilot signal is within a given region on an in-phase signal-quadrature signal plane, and outputs a signal having a restricted value in a case where the signal point is out of the given region, and the error detector obtains a phase error between the signal obtained by the output signal selector and the reference signal, and outputs the obtained phase error.

2. The carrier recovering apparatus of claim 1, wherein the output signal selector outputs, as the signal having the restricted value, a signal having been output immediately before in the case where the pilot signal has the signal point out of the given region.

3. A carrier recovering apparatus comprising:
a rotation calculator for multiplying a baseband signal and an oscillation signal and outputting a multiplied signal;
a pilot signal extractor for extracting a pilot signal from the signal output from the rotation calculator;
an error detection controller including an error detector and a restricting part for outputting a phase error between the pilot signal and a reference signal;
a loop filter for smoothing the phase error output from the error detection controller and outputting the smoothed phase error; and
a variable frequency oscillator for generating a signal in accordance with the output of the loop filter and outputting the generated signal as the oscillation signal, wherein:
the error detector obtains a phase error between the pilot signal and the reference signal and outputting the obtained phase error, and
the restricting part outputs the phase error obtained by the error detector in a case where a signal point determined by an in-phase signal component and a quadrature signal component of the pilot signal is within a given range on an in-phase signal-quadrature signal plane, and
outputs a predetermined value in a case where the signal point phase error is out of the given range.

4. The carrier recovering apparatus of claim 3, further comprising: a channel quality estimating part for estimating channel quality including a ratio of carrier power to noise power and a correlation value between the signal output from the rotation calculator and a given data pattern, and outputting the channel quality; and a control deciding part for obtaining a control signal in accordance with the channel quality, wherein the error detection controller is configured to, based on the control signal, either output the phase error between the pilot signal and the reference signal, or output the predetermined value.

5. The carrier recovering apparatus of claim 4, wherein the restricting part outputs the predetermined value when the control signal indicates that restricting of the phase error is necessary.

6. The carrier recovering apparatus of claim 4, wherein when the channel quality attained by changing the control signal is lower than channel quality attained before changing the control signal, the control deciding part restores the control signal to have a value used before changing the control signal.

7. The carrier recovering apparatus of claim 4, wherein the control deciding part has a hysteresis characteristic against change of the control signal in accordance with the channel quality.

8. The carrier recovering apparatus of claim 4, further comprising: a gain setting part for setting filter gain in accordance with the channel quality.

9. The carrier recovering apparatus of claim 8, wherein the gain setting part reduces the filter gain when the correlation value corresponding to a reflected wave is smaller than a given value.

10. The carrier recovering apparatus of claim 8, wherein the gain setting part increases the filter gain when the ratio is not less than a given value.

11. The carrier recovering apparatus of claim 8, wherein when the channel quality attained after changing the filter gain is lower than channel quality attained before changing the filter gain, the gain setting part restores the filter gain to a value used before changing the filter gain.

12. The carrier recovering apparatus of claim 8, wherein the gain setting part has a hysteresis characteristic against change of the filter gain in accordance with the channel quality.

13. A carrier recovering method comprising:
a rotation calculating step of multiplying a baseband signal and an oscillation signal;
a pilot signal extracting step of extracting a pilot signal from a multiplication result obtained in the rotation calculating step;
an error detection controlling step of obtaining a phase error between the pilot signal and a reference signal, the error detection controlling step including an output signal selecting step and an error detecting step;
a loop filtering step of smoothing a value obtained in the error detection controlling step; and
a variable frequency oscillating step of generating a signal in accordance with a value obtained in the loop filtering step as the oscillation signal, wherein:
in the output signal selecting step, the pilot signal is selected in a case where a signal point determined by an in-phase signal component and a quadrature signal component of the pilot signal is within a given region on an in-phase signal-quadrature signal plane, and a signal having a restricted value is outputted in a case where the signal point is out of the given region, and
in the error detecting step, a phase error between the signal obtained in the output signal selecting step and the reference signal is obtained and the obtained phase error is outputted.

14. The carrier recovering method of claim 13, wherein in the output signal selecting step, a signal having been output immediately before is used as the signal having the restricted value in the case where the pilot signal has the signal point out of the given region.

15. A carrier recovering method comprising:
a rotation calculating step of multiplying a baseband signal and an oscillation signal;
a pilot signal extracting step of extracting a pilot signal from a multiplication result obtained in the rotation calculating step;
an error detection controlling step of obtaining a phase error between the pilot signal and a reference signal, the error detection controlling step including an error detecting step and restricting step;
a loop filtering step of smoothing a value obtained in the error detection controlling step; and
a variable frequency oscillating step of generating a signal in accordance with a value obtained in the loop filtering step as the oscillation signal, wherein:
in the error detecting step, the phase error between the pilot signal and the reference signal is obtained, and
in the restricting step, the phase error obtained in the error detecting step is outputted in a case where a signal point determined by an in-phase signal component and a quadrature signal component of the pilot signal is within a given range on an in-phase signal-quadrature signal plane, and
a predetermined value is outputted in a case where the signal point is out of the given range.

16. The carrier recovering method of claim 15, further comprising: a channel quality estimating step of estimating channel quality including a ratio of carrier power to noise power and a correlation value between a signal output from the rotation calculator and a given data pattern, and outputting the channel quality; a control deciding step of obtaining a control signal in accordance with the channel quality, wherein in the error detection controlling step, based on the control signal, either the phase error between the pilot signal and the reference signal is outputted, or the predetermined value is outputted.

17. The carrier recovering method of claim 16, wherein in the restricting step, the predetermined value is outputted when the control signal indicates that restricting of the phase error is necessary.

18. The carrier recovering method of claim 16, wherein when the channel quality attained by changing the control signal is lower than channel quality attained before changing the control signal, the control signal is restored to have a value used before changing the control signal in the control deciding step.

19. The carrier recovering method of claim 16, wherein the control deciding step has a hysteresis characteristic against change of the control signal in accordance with the channel quality.

20. The carrier recovering method of claim 16, further-comprising: a gain setting step of setting filter gain in accordance with the channel quality.

21. The carrier recovering method of claim 20, wherein in the channel quality estimating step, the filter gain is reduced in the gain setting step when the correlation value corresponding to a reflected wave is smaller than a given value.

22. The carrier recovering method of claim 20, wherein the filter gain is increased in the gain setting step when the ratio is not less than a given value.

23. The carrier recovering method of claim 20, wherein when the channel quality attained after changing the filter gain is lower than channel quality attained before changing the filter gain, the filter gain is restored to a value used before changing the filter gain in the gain setting step.

24. The carrier recovering method of claim 20, wherein the gain setting step has a hysteresis characteristic against change of the filter gain in accordance with the channel quality.

* * * * *